(12) United States Patent
Xia et al.

(10) Patent No.: US 12,356,211 B2
(45) Date of Patent: Jul. 8, 2025

(54) SIDELINK BEAM SWEEPING

(71) Applicant: Huawei Technologies Co., Ltd., Shenzhen (CN)

(72) Inventors: Pengfei Xia, San Diego, CA (US); Bin Liu, San Diego, CA (US); Young Hoon Kwon, Seongnam-si (KR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 293 days.

(21) Appl. No.: 17/760,494

(22) PCT Filed: Feb. 14, 2020

(86) PCT No.: PCT/US2020/018406
§ 371 (c)(1),
(2) Date: Aug. 10, 2022

(87) PCT Pub. No.: WO2020/113246
PCT Pub. Date: Jun. 4, 2020

(65) Prior Publication Data
US 2023/0129257 A1    Apr. 27, 2023

(51) Int. Cl.
*H04W 72/04* (2023.01)
*H04L 5/00* (2006.01)
(Continued)

(52) U.S. Cl.
CPC ........... *H04W 16/28* (2013.01); *H04L 5/0051* (2013.01); *H04W 24/10* (2013.01)

(58) Field of Classification Search
CPC .... H04B 7/0695; H04L 5/0051; H04W 16/28; H04W 24/10; H04W 72/046; H04W 72/542
See application file for complete search history.

(56) References Cited

U.S. PATENT DOCUMENTS 10,498,504 B2    12/2019    Sang et al.
2019/0141692 A1    5/2019    Subramanian et al.
2020/0178221 A1*    6/2020    Byun ............... H04W 72/23

FOREIGN PATENT DOCUMENTS

EP    3726740 A1 *    10/2020    ............... H04B 1/40
JP    2020530673 A    10/2020
(Continued)

OTHER PUBLICATIONS

Spreadtrum Communications et al., "Considerations on beam-based transmission for Sidelink," 3GPP TSG RAN WG1 Meeting #94bis, Chengdu, China, Oct. 8-12, 2018, R1-1811003, 2pages.
(Continued)

*Primary Examiner* — Phuc H Tran
(74) *Attorney, Agent, or Firm* — Slater Matsil, LLP

(57) ABSTRACT

A computer-implemented method for sidelink beam sweeping includes transmitting, by a first electronic device and to a base station, uplink sounding reference signals (UL-SRSs) on N UL-SRS resources using N transmit beam patterns, where N is an integer greater than 1, receiving, by the first electronic device and from the base station, information associated with sidelink beam management (SL-BM), where the information associated with SL-BM indicates SL resources allocated to the first electronic device and beam pattern indices indicating transmit beam patterns for SL-BM, and transmitting, by the first electronic device and to a second electronic device, one or more sidelink beam management reference signals (SL-BMRSs), based on the received information associated with SL-BM, using one or more of the indicated transmit beam patterns.

28 Claims, 5 Drawing Sheets

(51) Int. Cl.
  *H04W 16/28* (2009.01)
  *H04W 24/10* (2009.01)

(56) References Cited

FOREIGN PATENT DOCUMENTS

| KR | 20190124828 A | 11/2019 | | |
|---|---|---|---|---|
| WO | WO-2017011106 A1 | * | 1/2017 | ........ H04W 72/0406 |
| WO | 2018023646 A1 | | 2/2018 | |
| WO | 2019009454 A1 | | 1/2019 | |
| WO | 2019187423 A1 | | 10/2019 | |

OTHER PUBLICATIONS

Spreadtrum Communications, "Discussion on NR V2X physical layer procedure", 3GPP TSG RAN WG1 #96, R1-1902724, Feb. 25-Mar. 1, 2019, 7 Pages, Athens, Greece.

* cited by examiner

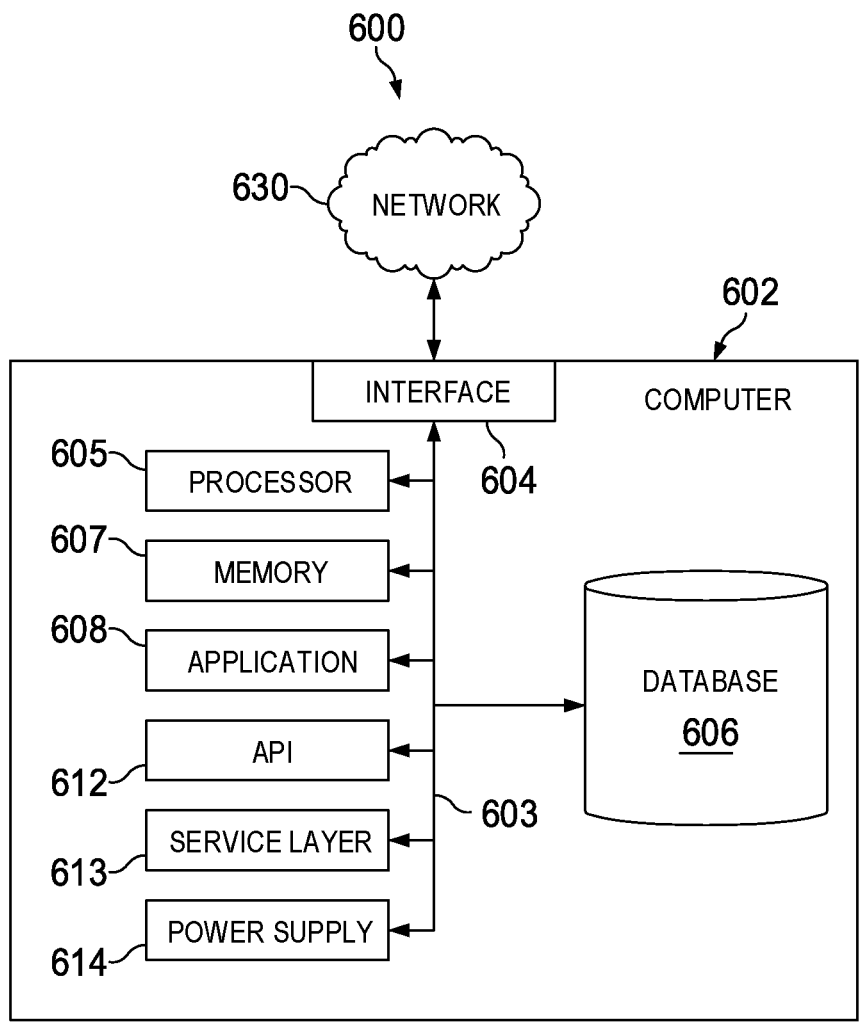
FIG. 6
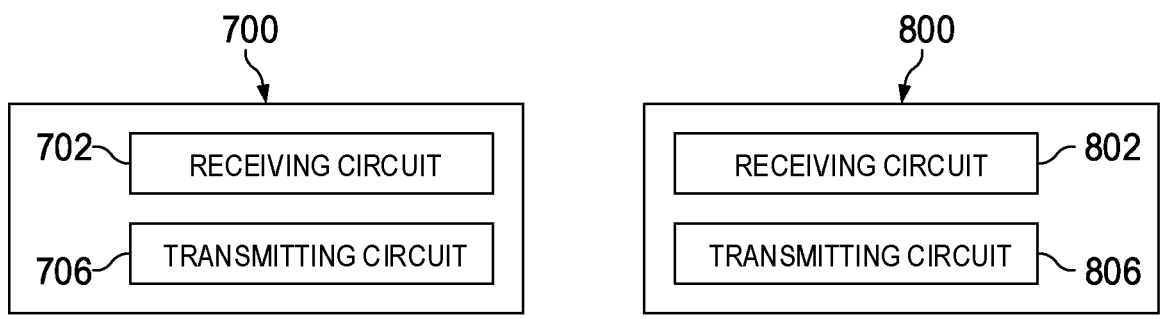
FIG. 7
FIG. 8

SIDELINK BEAM SWEEPING

CROSS-REFERENCE TO RELATED APPLICATIONS

This application is a National Stage of International Application No. PCT/US2020/018406, filed on Feb. 14, 2020, titled "Sidelink Beam Sweeping," application of which is incorporated herein by reference in its entirety.

TECHNICAL FIELD

This disclosure relates to sidelink beam sweeping, particularly, for beam sweeping in 3rd Generation Partnership Project (3GPP) New Radio (NR) systems to support sidelink beam management.

BACKGROUND

In 3GPP NR systems, downlink beam management and uplink beam management are supported. A downlink refers to a link from a base station to a device. An uplink refers to a link from a device to a base station.

SUMMARY

The present disclosure describes sidelink beam sweeping for device to device (D2D) communication.

In a first implementation, a computer-implemented method includes: transmitting, by a first electronic device and to a base station, uplink sounding reference signals (UL-SRSs) on N UL-SRS resources using N transmit beam patterns, where N is an integer greater than 1; receiving, by the first electronic device and from the base station, information associated with sidelink beam management (SL-BM), where the information associated with SL-BM indicates SL resources allocated to the first electronic device and beam pattern indices indicating transmit beam patterns for SL-BM; and transmitting, by the first electronic device and to a second electronic device, one or more sidelink beam management reference signals (SL-BMRSs), based on the received information associated with SL-BM, using one or more of the indicated transmit beam patterns.

In a second implementation, an electronic device includes: a non-transitory memory storage comprising instructions; and one or more hardware processors in communication with the memory storage, where the one or more hardware processors execute the instructions to perform operations comprising: transmitting, to a base station, uplink sounding reference signals (UL-SRSs) on N UL-SRS resources using N transmit beam patterns, where N is an integer greater than 1; receiving, from the base station, information associated with sidelink beam management (SL-BM), where the information associated with SL-BM indicates SL resources allocated to the first electronic device and beam pattern indices indicating transmit beam patterns for SL-BM; and transmitting, to a second electronic device, one or more sidelink beam management reference signals (SL-BMRSs), based on the received information associated with SL-BM, using one or more of the indicated transmit beam patterns.

In a third implementation, a non-transitory computer-readable medium storing computer instructions for transmission beam control in a data communication, that when executed by one or more hardware processors, cause the one or more hardware processors to perform operations including: transmitting, by a first electronic device and to a base station, uplink sounding reference signals (UL-SRSs) on N UL-SRS resources using N transmit beam patterns, where N is an integer greater than 1; receiving, by the first electronic device and from the base station, information associated with sidelink beam management (SL-BM), where the information associated with SL-BM indicates SL resources allocated to the first electronic device and beam pattern indices indicating transmit beam patterns for SL-BM; and transmitting, by the first electronic device and to a second electronic device, one or more sidelink beam management reference signals (SL-BMRSs), based on the received information associated with SL-BM, using one or more of the indicated transmit beam patterns.

In a fourth implementation, a computer-implemented method includes: receiving, by a base station and from a first electronic device, uplink sounding reference signals (UL-SRSs) on N UL-SRS resources using N transmit beam patterns, where N is an integer greater than 1; and transmitting, by the base station and to the first electronic device, information associated with sidelink beam management (SL-BM), where the information associated with SL-BM indicates SL resources allocated to the first electronic device and beam pattern indices indicating transmit beam patterns for SL-BM.

In a fifth implementation, a base station includes: a non-transitory memory storage comprising instructions; and one or more hardware processors in communication with the memory storage, where the one or more hardware processors execute the instructions to perform operations comprising: receiving, from a first electronic device, uplink sounding reference signals (UL-SRSs) on N UL-SRS resources using N transmit beam patterns, where N is an integer greater than 1; and transmitting, to the first electronic device, information associated with sidelink beam management (SL-BM), where the information associated with SL-BM indicates SL resources allocated to the first electronic device and beam pattern indices indicating transmit beam patterns for SL-BM.

In a sixth implementation, a non-transitory computer-readable medium storing computer instructions for transmission beam control in a data communication, that when executed by one or more hardware processors, cause the one or more hardware processors to perform operations including: receiving, by a base station and from a first electronic device, uplink sounding reference signals (UL-SRSs) on N UL-SRS resources using N transmit beam patterns, where N is an integer greater than 1; and transmitting, by the base station and to the first electronic device, information associated with sidelink beam management (SL-BM), where the information associated with SL-BM indicates SL resources allocated to the first electronic device and beam pattern indices indicating transmit beam patterns for SL-BM.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method and the instructions stored on the non-transitory, computer-readable medium.

The details of one or more implementations of the subject matter of this specification are set forth in the accompanying drawings and the description. Other features, aspects, and

BRIEF DESCRIPTION OF THE DRAWINGS

FIG. 6 is a block diagram of an example computer system used to provide computational functionalities associated with described algorithms, methods, functions, processes, flows, and procedures, as described in the instant disclosure, according to an implementation.

FIG. 7 is a schematic diagram illustrating an example structure of a terminal described in the present disclosure, according to an implementation.

FIG. 8 is a schematic diagram illustrating an example structure of a base station described in the present disclosure, according to an implementation.

Like reference numbers and designations in the various drawings indicate like elements.

DETAILED DESCRIPTION OF ILLUSTRATIVE EMBODIMENTS

Figure 1:
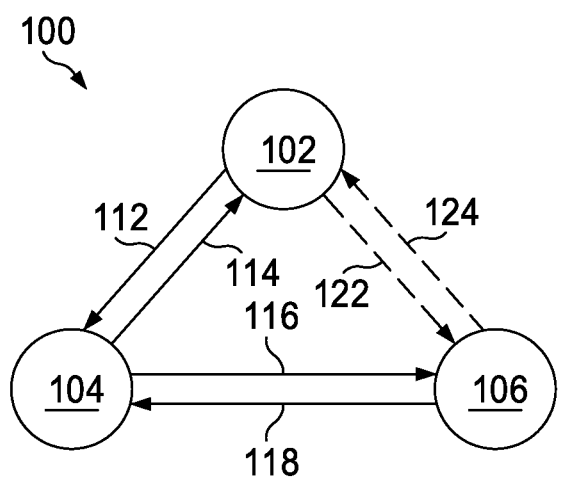
FIG. 1 is a block diagram illustrating sidelink beam sweeping for device to device (D2D) communication, according to an implementation.

The following detailed description describes sidelink beam sweeping for device to device (D2D) communication and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

The 3rd Generation Partnership Project (3GPP) New Radio (NR) systems can support downlink beam management and uplink beam management. A downlink refers to a link from a base station to a device. An uplink refers to a link from a device to a base station. However, sidelink beam management (e.g., sidelink in millimeter wave frequency) is not supported in the current 3GPP NR systems. A sidelink can be defined for direct D2D communication without going through a base station (such as a 5G base station (gNB)).

The present disclosure describes example implementations of sidelink beam sweeping for D2D communication. In the present disclosure, a first electronic device can transmit an uplink sounding reference signal (UL-SRS) in multiple directions. A base station can perform measurements of the multiple transmissions by the first electronic device. Then, the base station can transmit a transmitter quasi co-located (Tx-QCL) relationship (or an Anti-Tx-QCL relationship) between the UL-SRS and a sidelink beam management reference signal (SL-BMRS) to the first electronic device. The first electronic device can perform sidelink beam management based on the Tx-QCL relationship (or the Anti-Tx-QCL relationship) between the UL-SRS and the SL-BMRS.

The subject matter described in the present disclosure can be implemented in particular implementations so as to realize one or more of the following advantages. First, the described approach can save sidelink resources. For example, when range extension is important, the first electronic device can perform sidelink beam management with a second electronic device that is outside coverage of the base station. Second, the described approach can control undesired sidelink (SL) interferences on the base station. For example, the base station can guide transmit beam sweeping at the first electronic device away from the base station. Third, the described approach can allow spatial reuse between sidelink and other links (e.g., uplinks). Other advantages will be apparent to those of ordinary skill in the art.

FIG. 1 is a block diagram 100 illustrating sidelink beam sweeping for device to device (D2D) communication, according to an implementation. The block diagram 100 includes a base station 102, user equipment (UE) 104, and UE 106. For example, the base station 102 can communicate with UE 104 through downlink 112 and uplink 114. UE 104 can communicate with UE 106 through forward sidelink 116 and reverse sidelink 118. If UE 106 is under coverage of the base station 102, the base station 102 can communicate with UE 106 through downlink 122 and uplink 124. In some implementations, additional, different, or fewer UEs can be included in the block diagram 100.

As illustrated in FIG. 1, sidelink mode 1 is considered. In sidelink mode 1, a transmitting UE (TxUE), such as the UE 104, is under coverage of the base station 102. A receiving UE (RxUE), such as the UE 106, may or may not under coverage of the base station 102. In some implementations, other sidelink modes can be considered in FIG. 1.

Figure 2:
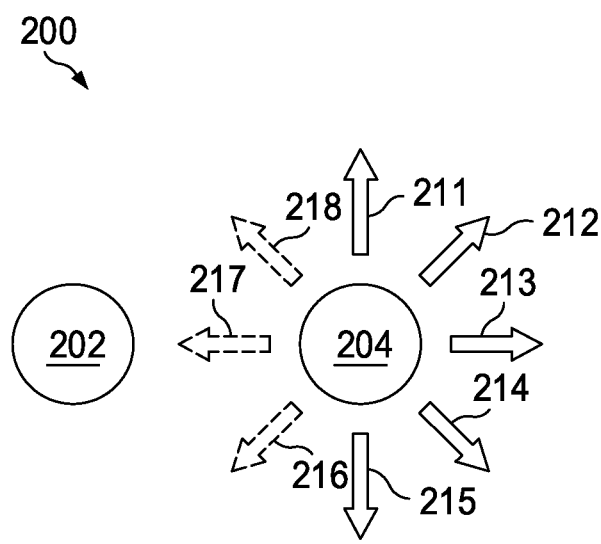
FIG. 2 is a block diagram illustrating transmit beam sweeping, according to an implementation.

In some implementations, sidelink beam management performed by the TxUE needs to support sidelink in millimeter wave frequency. In general, transmit beam sweeping is needed at the TxUE so that different RxUEs at different locations can be accommodated. Transmit beam sweeping is usually performed in an omni-directional way. For example, as shown in FIG. 2 below, N transmit beams at the TxUE can be used to mimic an omni-directional coverage. However, large N results in large beam sweeping overhead and large interference.

FIG. 2 is a block diagram 200 illustrating transmit beam sweeping, according to an implementation. The block diagram 200 includes a base station 202 and UE 204. For example, the UE 204 can use eight transmit beams 211-218 to perform transmit beam sweeping. In some implementations, additional, different, or fewer transmit beams can be included in the block diagram 200.

In some implementations, it is desirable for the base station 202 to guide transmit beam sweeping at the UE 204 to avoid interference at the base station 202. For example, when the UE 204 transmits SL-BMRS, the base station 202 may prefer the UE 204 to transmit SL-BMRS using transmit beams 211-215 that extends the range of the UE 204 further away from the base station 202. In other words, the base station 202 may prohibit the UE 204 from using transmit beams 216-218, that are toward the base station 202, to transmit SL-BMRS.

As illustrated in FIG. 2, the UE 204 is under coverage of the base station 202. The UE 204 can perform transmit beam sweeping on eight directions (i.e., using the eight transmit beams 211-218). In some implementations, the UE 204 can perform transmit beam sweeping on any number of directions. The eight transmissions can be sent by the UE 204 as sidelink transmissions in sidelink time or frequency resources, in which case the base station 202 is not the intended receiver. In some implementations, the eight transmissions can be sent by the UE 204 as uplink transmissions in uplink time or frequency resources, in which case the base station 202 is the intended receiver. To simplify the discussion, the following process will be described assuming that the eight transmissions are sent as uplink transmissions in uplink time or frequency resources. The following process can be applied to cases where the eight transmissions are sent as sidelink transmissions in sidelink time or frequency resources.

The base station 202 can perform measurements of the eight transmissions. In some implementations, scheduling of the eight transmissions and configuration of corresponding uplink time or frequency resources can be determined by the base station 202, and the eight directions (i.e., the eight transmit beams 211-218) can be determined by the UE 204. Each transmission can include a reference signal. For example, the reference signal can be an uplink sounding reference signal (UL-SRS) in an uplink transmission, and a sidelink sounding reference signal (SL-SRS) in a sidelink transmission. In some implementations, UL-SRS or SL-SRS can be different from SL-BMRS.

Based on measurement results, the base station 202 can transmit to the UE 204 beam pattern (or direction) recommendations for sidelink beam sweeping with a particular RxUE (e.g., RxUE-specific recommendations). The particular RxUE can be a UE with which the UE 204 wants to establish a sidelink. For example, the base station 202 can indicate to the UE 204 that if the UE 204 wants to perform sidelink beam management with the particular RxUE, the UE 204 should use transmit beams 211-215 to transmit SL-BMRS. The indication can be a transmitter quasi co-located (Tx-QCL) relationship between SL-BMRS and UL-SRS. To build the Tx-QCL relationship, the UE 204 can use the same transmit beamforming vector (or filter) to transmit SL-BMRS on sidelink resources and to transmit UL-SRS on uplink resources.

In some implementations, the beam pattern (or direction) recommendations may not be RxUE-specific. For example, there is no specific UE with which the UE 204 wants to establish a sidelink. In other words, no matter which RxUE the UE 204 wants to perform sidelink beam management with, the recommendations can instruct the UE 204 to use the recommended transmit beams 211-215.

In some implementations, instead of beam pattern (or direction) recommendations, the base station 202 can transmit to the UE 204 beam pattern (or direction) prohibitions for sidelink beam sweeping with a particular RxUE (e.g., RxUE-specific prohibitions). The particular RxUE can be a UE with which the UE 204 wants to establish a sidelink. For example, the base station 202 can indicate to the UE 204 that if the UE 204 wants to perform sidelink beam management with the particular RxUE, the UE 204 should not use transmit beams 216-218 to transmit SL-BMRS. The indication can be an Anti-Tx-QCL relationship between SL-BMRS and UL-SRS. The Anti-Tx-QCL relationship can indicate to the UE 204 that the UE 204 can use the sounded but not prohibited transmit beamforming vector to transmit SL-BMRS on sidelink resources. In this case, transmit beams 211-218 are sounded and transmit beams 216-218 are prohibited.

In some implementations, the beam pattern (or direction) prohibitions may not be RxUE-specific. For example, there is no specific UE with which the UE 204 wants to establish a sidelink. In other words, no matter which RxUE the UE 204 wants to perform sidelink beam management with, the prohibitions can instruct the UE 204 not to use the prohibited transmit beams 216-218.

In some implementations, the UE 204 may not use a transmit beamforming vector, that has not been sounded in previously described transmit beam sweeping, to transmit SL-BMRS.

Figure 3:
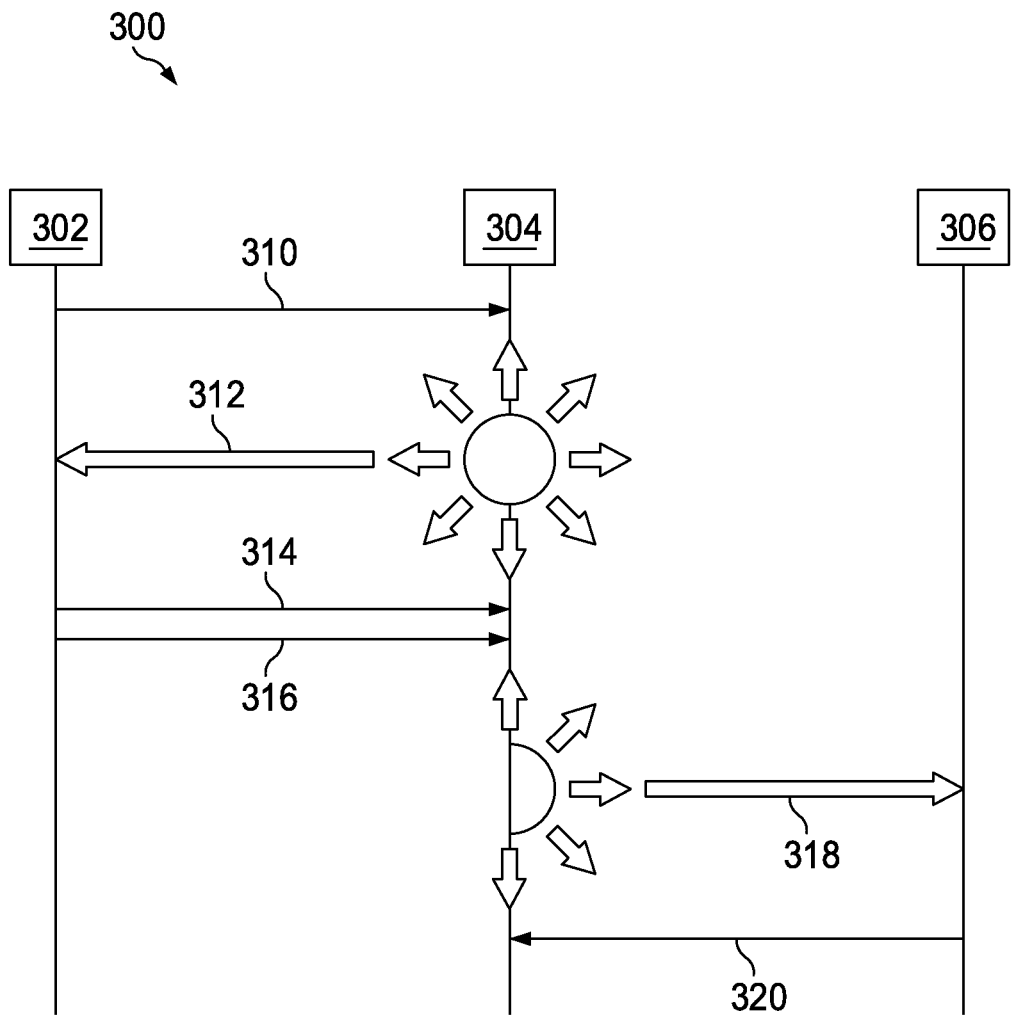
FIG. 3 is a swim diagram illustrating an example method for sidelink beam sweeping for D2D communication, according to an implementation.

FIG. 3 is a swim diagram illustrating an example method 300 for sidelink beam sweeping for D2D communication, according to an implementation. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

As illustrated in FIG. 3, a UE 304 is under coverage of a base station 302. A UE 306 may or may not under coverage of the base station 302. The UE 304 wants to perform sidelink beam management with the UE 306. For example, the UE 304 wants to transmit SL-BMRS to the UE 306. In some implementations, SL-BMRS can be a sidelink channel state information reference signal (SL-CSIRS).

At 310, the base station 302 can configure N UL-SRS resources for uplink sounding by the UE 304. For example, the base station 302 can transmit configuration information indicating the N UL-SRS resources to the UE 304. In some implementations, N can be any integer greater than 1.

At 312, the UE 304 can choose up to N different transmit beams, and transmit SRS on the N UL-SRS resources to the base station 302. For example, the UE 304 can transmit SRS using eight transmit beams as illustrated in FIG. 3.

At 314, the base station 302 can measure the N transmissions on the N UL-SRS resources, and transmit recommendations (or prohibitions) to the UE 304 for sidelink beam management with the UE 306 based on the measurements. In some implementations, based on the measurements, the base station 302 can determine Q recommended transmit beams from the N transmit beams, and transmit to the UE 304 a Tx-QCL relationship indicating the Q recommended transmit beams for sidelink beam management with the UE 306. For example, each of the Q recommended transmit beams can result in interference (e.g., measured signal strength) at the base station 302 below a predetermined threshold.

In some implementations, based on the measurements, the base station 302 can determine P prohibited transmit beams from the N transmit beams, and transmit to the UE 304 an Anti-Tx-QCL relationship indicating the P prohibited transmit beams for sidelink beam management with the UE 306. For example, each of the P prohibited transmit beams can result in interference at the base station 302 above the predetermined threshold.

In some implementations, instead of transmitting the Tx-QCL relationship or the Anti-Tx-QCL relationship to the UE 304, the base station 302 can transmit a bitmap with N bits corresponding to the N sounded beams. For example, a positive bit (e.g., 1) in the bitmap can indicate that the corresponding beam is recommended for sidelink beam management with the UE 306, and a negative bit (e.g., 0 or −1) in the bitmap can indicate that the corresponding beam is prohibited for sidelink beam management with the UE 306.

At 316, the base station 302 can schedule SL-BMRS transmission resources for the UE 304. For example, the base station 302 can transmit configuration information indicating the SL-BMRS transmission resources to the UE 304. The SL-BMRS transmission resources can be scheduled based on the Q recommended transmit beams or the P prohibited transmit beams. In other words, the SL-BMRS transmission resources can accommodate SL-BMRS transmission using the Q recommended transmit beams or the P prohibited transmit beams.

At 318, the UE 304 can transmit SL-BMRS to the UE 306 on the SL-BMRS transmission resources using the Q recommended transmit beams or the P prohibited transmit beams. For example, the UE 304 can transmit SL-BMRS to the UE 306 using five transmit beams from the eight transmit beams as illustrated in FIG. 3. After transmitting SL-BMRS to the UE 306, the UE 304 can wait for a sidelink beam report generated by the UE 306.

At 320, the UE 306 can measure the SL-BMRS on the SL-BMRS transmission resources to generate a sidelink beam report, and transmit the sidelink beam report to the UE 304 on a sidelink between the UE 306 and the UE 304. In some implementations, the UE 306 can transmit the sidelink beam report to the base station 302 on an uplink between the base station 302 and the UE 306. The base station 302 can forward the sidelink beam report to the UE 304 on a downlink between the base station 302 and the UE 304.

In some implementations, prohibitions, rather than recommendations, can be used by the base station 302. This is because the base station 302 can have a more accurate estimation of beam quality of undesired beam directions (e.g., toward the base station 302) than desired beam directions (e.g., away from the base station 302).

Figure 4:
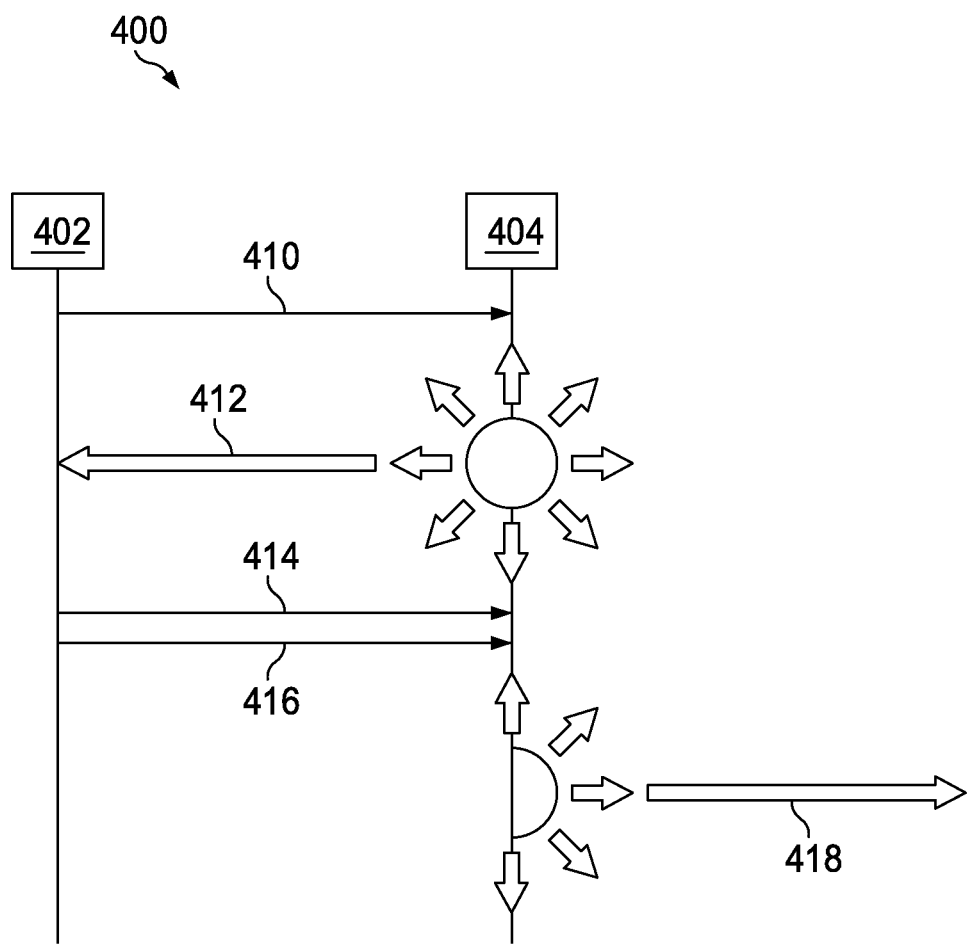
FIG. 4 is a swim diagram illustrating another example method for sidelink beam sweeping for D2D communication, according to an implementation.

FIG. 4 is a swim diagram illustrating another example method 400 for sidelink beam sweeping for D2D communication, according to an implementation. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

As illustrated in FIG. 4, a UE 404 is under coverage of a base station 402. There is no specific UE with which the UE 404 wants to perform sidelink beam management. In this case, SL-BMRS is broadcasted by the UE 404 with no specific RxUE. In some implementations, SL-BMRS can be a sidelink synchronization signal block (SL-SSB).

At 410, the base station 402 can configure N UL-SRS resources for uplink sounding by the UE 404. For example, the base station 402 can transmit configuration information indicating the N UL-SRS resources to the UE 404. In some implementations, N can be any integer greater than 1.

At 412, the UE 404 can choose up to N different transmit beams, and transmit SRS on the N UL-SRS resources to the base station 402. For example, the UE 404 can transmit SRS using eight transmit beams as illustrated in FIG. 4.

At 414, the base station 402 can measure the N transmissions on the N UL-SRS resources, and transmit recommendations (or prohibitions) to the UE 404 for sidelink beam management based on the measurements. In some implementations, based on the measurements, the base station 402 can determine Q recommended transmit beams from the N transmit beams, and transmit to the UE 404 a Tx-QCL relationship indicating the Q recommended transmit beams for sidelink beam management 4. For example, each of the Q recommended transmit beams can result in interference (e.g., measured signal strength) at the base station 402 below a predetermined threshold.

In some implementations, based on the measurements, the base station 402 can determine P prohibited transmit beams from the N transmit beams, and transmit to the UE 404 an Anti-Tx-QCL relationship indicating the P prohibited transmit beams for sidelink beam management. For example, each of the P prohibited transmit beams can result in interference at the base station 402 above the predetermined threshold.

In some implementations, instead of transmitting the Tx-QCL relationship or the Anti-Tx-QCL relationship to the UE 404, the base station 402 can transmit a bitmap with N bits corresponding to the N sounded beams. For example, a positive bit (e.g., 1) in the bitmap can indicate that the corresponding beam is recommended for sidelink beam management with no specific RxUE, and a negative bit (e.g., 0 or −1) in the bitmap can indicate that the corresponding beam is prohibited for sidelink beam management with no specific RxUE.

At 416, the base station 402 can schedule SL-BMRS transmission resources for the UE 404. For example, the base station 402 can transmit configuration information indicating the SL-BMRS transmission resources to the UE 404. The SL-BMRS transmission resources can be scheduled based on the Q recommended transmit beams or the P prohibited transmit beams. In other words, the SL-BMRS transmission resources can accommodate SL-BMRS transmission using the Q recommended transmit beams or the P prohibited transmit beams.

At 418, the UE 404 can broadcast SL-BMRS on the SL-BMRS transmission resources using the Q recommended transmit beams or the P prohibited transmit beams. For example, the UE 404 can broadcast SL-BMRS using five transmit beams from the eight transmit beams as illustrated in FIG. 4. After broadcasting SL-BMRS, the UE 404 can wait for a sidelink beam report generated by any RxUE.

In some implementations, prohibitions, rather than recommendations, can be used by the base station 402. This is because the base station 402 can have a more accurate estimation of beam quality of undesired beam directions (e.g., toward the base station 402) than desired beam directions (e.g., away from the base station 402).

Figure 5:
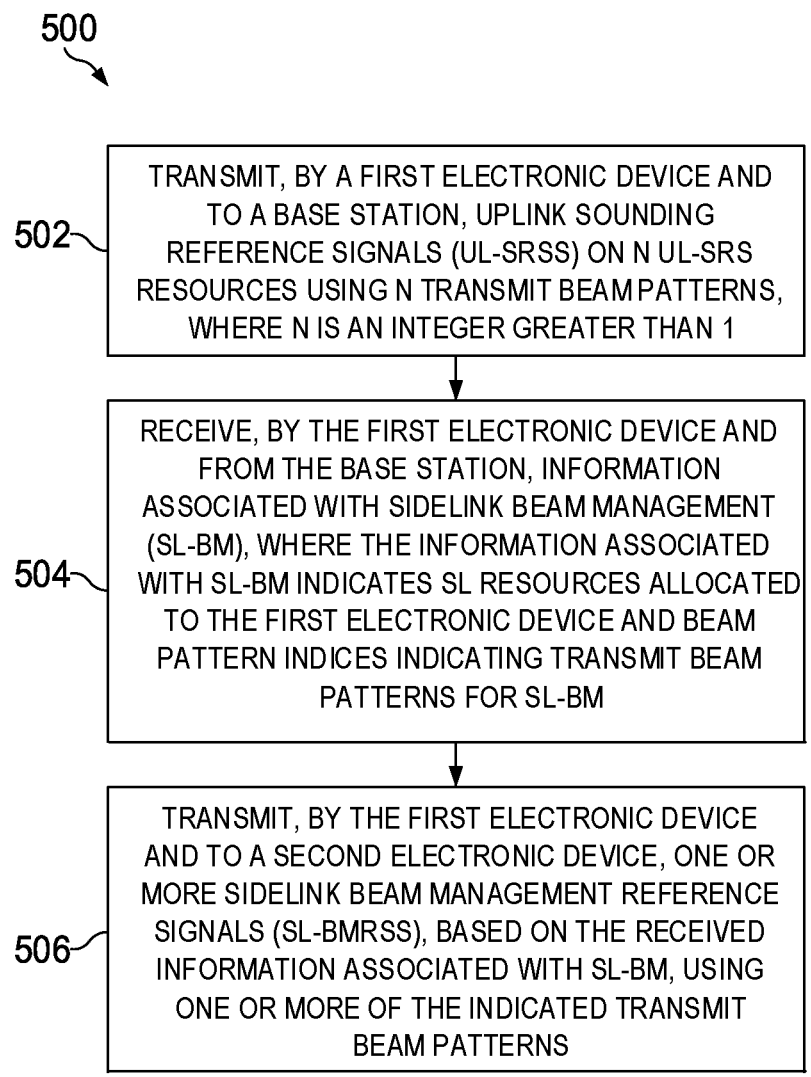
FIG. 5 is a flow diagram illustrating an example method for sidelink beam sweeping for D2D communication, according to an implementation.

FIG. 5 is a flow diagram illustrating an example method 500 for sidelink beam sweeping for D2D communication, according to an implementation. For clarity of presentation, the description that follows generally describes method 500 in the context of the other figures in this description. The method 500 can be implemented by an electronic device, e.g., the UE 304 illustrated in FIG. 3. However, it will be understood that the method 500 may be performed, for example, by any suitable system, environment, software, and hardware, or a combination of systems, environments, software, and hardware, as appropriate. In some implementations, various steps of the method 500 can be run in parallel, in combination, in loops, or in any order.

The method 500 begins at 502, where a first electronic device transmits to a base station uplink sounding reference signals (UL-SRSs) on N UL-SRS resources using N transmit beam patterns. N is an integer greater than 1. For example, N can be 8, 16, 32, or 64. In some implementations, the base station can include a 5G base station (gNB), and the first electronic device is under coverage of the gNB.

At 504, the first electronic device receives from the base station information associated with sidelink beam management (SL-BM). The information associated with SL-BM can indicate SL resources allocated to the first electronic device and beam pattern indices indicating transmit beam patterns for SL-BM. For example, the information associated with SL-BM can include a bitmap with N bits. A positive bit in the bitmap can indicate that a corresponding transmit beam pattern is allowed for transmitting one or more sidelink beam management reference signals (SL-BMRSs), and a negative or zero bit in the bitmap can indicate that a corresponding transmit beam pattern is prohibited for transmitting the SL-BMRSs.

In some implementations, the first electronic device can receive, from the base station, a transmitter quasi co-located (Tx-QCL) relationship between the UL-SRSs and the SL-BMRSs. For example, the Tx-QCL relationship can indicate Q transmit beam patterns from the N transmit beam patterns allowed for SL-BM. Each transmit beam pattern of the Q transmit beam patterns can indicate a direction at the first electronic device and away from the base station. Q is an integer greater than or equal to 1 and less than N. The first electronic device can also receive, from the base station, an allocation of the SL resources allocated by the base station for the SL-BMRSs.

In some implementations, the first electronic device can receive, from the base station, an Anti-Tx-QCL relationship between the UL-SRSs and the SL-BMRSs. For example, the Anti-Tx-QCL relationship can indicate P transmit beam patterns from the N transmit beam patterns not allowed for SL-BM. P is an integer greater than or equal to 1 and less than N. The first electronic device can also receive, from the base station, an allocation of the SL resources allocated by the base station for the SL-BMRSs.

At 506, the first electronic device transmits, to a second electronic device, one or more SL-BMRSs, based on the received information associated with SL-BM, using one or more of the indicated transmit beam patterns. In some implementations, the second electronic device can be outside coverage of the base station, and the first and second electronic devices can communicate through a sidelink. In some implementations, the first electronic device can broadcast the SL-BMRSs without a specific receiving electronic device.

In some implementations, the first electronic device can transmit, to the second electronic device, the SL-BMRSs on the SL resources using beams from the Q transmit beam patterns. In some implementations, the first electronic device can transmit, to the second electronic device, the SL-BMRSs on the SL resources using transmit beam patterns that are included in the N transmit beam patterns and not included in the P transmit beam patterns.

In some implementations, before the first electronic device transmits the UL-SRSs to the base station, the first electronic device can receive, from the base station, configuration information indicating the N UL-SRS resources for uplink sounding. The first electronic device can determine the N transmit beam patterns based on the N UL-SRS resources for uplink sounding.

In some implementations, after the first electronic device transmits the SL-BMRSs to the second electronic device, the first electronic device can receive, from the second electronic device, a SL beam report. The SL beam report can be generated by the second electronic device based on measurements of the SL-BMRSs on the SL resources.

FIG. 6 is a block diagram of an example computer system 600 used to provide computational functionalities associated with described algorithms, methods, functions, processes, flows, and procedures, as described in the instant disclosure, according to an implementation. The computer system 600, or more than one computer system 600, can be used to implement the electronic device described previously in this disclosure, e.g., the UE 304 illustrated in FIG. 3.

In some aspects, the computer 602 may comprise a computer that includes an input device, such as a keypad, keyboard, touch screen, or other device that can accept user information, and an output device that conveys information associated with the operation of the computer 602, including digital data, visual, or audio information (or a combination of information), or a graphical user interface (GUI).

The computer 602 can serve in a role as a client, network component, a server, a database or other persistence, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environments (or a combination of environments).

At a high level, the computer 602 is an electronic computing device operable to receive, transmit, process, store, or manage data and information associated with the described subject matter. According to some implementations, the computer 602 may also include, or be communicably coupled with, an application server, e-mail server, web server, caching server, streaming data server, or other servers (or a combination of servers).

The computer 602 can receive requests over network 630 from a client application (for example, executing on another computer 602) and respond to the received requests by processing the received requests using an appropriate software application(s). In addition, requests may also be sent to the computer 602 from internal users (for example, from a command console or by other appropriate access methods), external or third-parties, other automated applications, as well as any other appropriate entities, individuals, systems, or computers.

Each of the components of the computer 602 can communicate using a system bus 603. In some implementations, any or all of the components of the computer 602, hardware or software (or a combination of both hardware and software), may interface with each other or the interface 604 (or a combination of both), over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, C++, or other suitable language providing data in extensible markup language (XML) format or other suitable formats. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network 630 (whether illustrated or not) in a distributed environment. Generally, the interface 604 includes logic encoded in software or hardware (or a combination of software and hardware) and is operable to communicate with the network 630. More specifically, the interface 604 may include software supporting one or more communication protocols associated with communication such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a database 6o6 that can hold data for the computer 602 or other components (or a combination of both) that can be connected to the network 630 (whether illustrated or not). For example, database 6o6 can be an in-memory, conventional, or other types of database storing data consistent with this disclosure. In some implementations, database 6o6 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602.

The computer 602 also includes a memory 607 that can hold data for the computer 602 or other components (or a combination of both) that can be connected to the network 630 (whether illustrated or not). For example, memory 607 can be Random Access Memory (RAM), Read-Only Memory (ROM), optical, magnetic, and the like, storing data consistent with this disclosure. In some implementations, memory 607 can be a combination of two or more different types of memory (for example, a combination of RAM and magnetic storage) according to particular needs, desires, or particular implementations of the computer 602 and the described functionality. Although illustrated as a single memory 607 in FIG. 6, two or more memories 607 (of the same or a combination of types) can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to the functionality described in this disclosure. For example, application 608 can serve as one or more components, modules, or applications. Further, although illustrated as a single application 608, the application 608 may be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or other power management functionality). In some implementations, the power supply 614 can include a power plug to allow the computer 602 to be plugged into a wall socket or other power source to, for example, power the computer 602 or recharge a rechargeable battery.

There may be any number of computers 602 associated with, or external to, a computer system containing computer 602, each computer 602 communicating over network 630. Further, the term "client," "user," and other appropriate terminology may be used interchangeably, as appropriate, without departing from the scope of this disclosure. Moreover, this disclosure contemplates that many users may use one computer 602, or that one user may use multiple computers 602.

FIG. 7 is a schematic diagram illustrating an example structure of a terminal 700 described in the present disclosure, according to an implementation. The terminal 700 includes a receiving circuit 702, and a transmitting circuit 706. In some implementations, terminal 700 can further include one or more circuits for performing any one or a combination of steps described in the present disclosure.

The receiving circuit 702 is configured to receive information associated with sidelink beam management (SL-BM) from a base station. The information associated with the SL-BM can indicates SL resources allocated to the terminal 700 and beam pattern indices indicating transmit beam patterns for SL-BM.

The transmitting circuit 706 is configured to transmit an uplink sounding reference signal (UL-SRS) on N UL-SRS resources using N transmit beam patterns to the base station, and to transmit a sidelink beam management reference signal (SL-BMRS) to another terminal. N is an integer greater than 1.

FIG. 8 is a schematic diagram illustrating an example structure of a base station 800 described in the present disclosure, according to an implementation. The base station 800 includes a receiving circuit 802, and a transmitting circuit 8o6. In some implementations, the base station 800 can further include one or more circuits for performing any one or a combination of steps described in the present disclosure.

The receiving circuit 802 is configured to receive an uplink sounding reference signal (UL-SRS) from a terminal.

The transmitting circuit 806 is configured to transmit information associated with sidelink beam management (SL-BM) to the terminal. The information associated with the SL-BM can indicate SL resources allocated to the terminal and beam pattern indices indicating transmit beam patterns for SL-BM.

Described implementations of the subject matter can include one or more features, alone or in combination.

In a first implementation, a computer-implemented method includes: transmitting, by a first electronic device and to a base station, uplink sounding reference signals (UL-SRSs) on N UL-SRS resources using N transmit beam patterns, where N is an integer greater than 1; receiving, by the first electronic device and from the base station, information associated with sidelink beam management (SL-BM), where the information associated with SL-BM indicates SL resources allocated to the first electronic device and beam pattern indices indicating transmit beam patterns for SL-BM; and transmitting, by the first electronic device and to a second electronic device, one or more sidelink beam management reference signals (SL-BMRSs), based on the received information associated with SL-BM, using one or more of the indicated transmit beam patterns.

The foregoing and other described implementations can each, optionally, include one or more of the following features:

A first feature, combinable with any of the following features, where receiving the information associated with SL-BM comprises: receiving, by the first electronic device and from the base station, a transmitter quasi co-located (Tx-QCL) relationship between the UL-SRSs and the SL-BMRSs, where the Tx-QCL relationship indicates Q transmit beam patterns from the N transmit beam patterns for SL-BM, and Q is an integer greater than or equal to 1 and less than N; and receiving, by the first electronic device and from the base station, an allocation of the SL resources, where the SL resources are allocated by the base station for the SL-BMRSs; and where transmitting, by the first electronic device and to the second electronic device, the SL-BMRSs comprises transmitting, by the first electronic device and to the second electronic device, the SL-BMRSs on the SL resources using beams from the Q transmit beam patterns.

A second feature, combinable with any of the previous or following features, where each transmit beam pattern of the Q transmit beam patterns indicates a direction away from the base station.

A third feature, combinable with any of the previous or following features, where receiving the information associated with SL-BM comprises: receiving, by the first electronic device and from the base station, an Anti-Tx-QCL relationship between the UL-SRSs and the SL-BMRSs, where the Anti-Tx-QCL relationship indicates P transmit beam patterns from the N transmit beam patterns not for SL-BM, and P is an integer greater than or equal to 1 and less than N; and receiving, by the first electronic device and from the base station, an allocation of the SL resources, where the SL resources are allocated by the base station for the SL-BMRSs; and where transmitting, by the first electronic device and to the second electronic device, the SL-BMRSs comprises transmitting, by the first electronic device and to the second electronic device, the SL-BMRSs on the SL resources using transmit beam patterns that are included in the N transmit beam patterns and not included in the P transmit beam patterns.

A fourth feature, combinable with any of the previous or following features, further comprising: receiving, by the first electronic device and from the base station, configuration information indicating the N UL-SRS resources; determining, by the first electronic device, the N transmit beam patterns based on the N UL-SRS resources; and receiving, by the first electronic device and from the second electronic device, a SL beam report, where the SL beam report is generated by the second electronic device based on measurements of the SL-BMRSs on the SL resources.

A fifth feature, combinable with any of the previous or following features, where the information associated with SL-BM includes a bitmap with N bits, a positive bit in the bitmap indicates that a corresponding transmit beam pattern is allowed for transmitting the SL-BMRSs, and a negative or zero bit in the bitmap indicates that a corresponding transmit beam pattern is prohibited for transmitting the SL-BMRSs.

A sixth feature, combinable with any of the previous or following features, where the base station includes a 5G base station (gNB), the first electronic device is under coverage of the gNB, the second electronic device is outside the coverage of the gNB, and the first and second electronic devices communicate through a sidelink.

In a second implementation, an electronic device includes: a non-transitory memory storage comprising instructions; and one or more hardware processors in communication with the memory storage, where the one or more hardware processors execute the instructions to perform operations comprising: transmitting, to a base station, uplink sounding reference signals (UL-SRSs) on N UL-SRS resources using N transmit beam patterns, where N is an integer greater than 1; receiving, from the base station, information associated with sidelink beam management (SL-BM), where the information associated with SL-BM indicates SL resources allocated to the first electronic device and beam pattern indices indicating transmit beam patterns for SL-BM; and transmitting, to a second electronic device, one or more sidelink beam management reference signals (SL-BMRSs), based on the received information associated with SL-BM, using one or more of the indicated transmit beam patterns.

The foregoing and other described implementations can each, optionally, include one or more of the following features:

A first feature, combinable with any of the following features, where receiving the information associated with SL-BM comprises: receiving, from the base station, a transmitter quasi co-located (Tx-QCL) relationship between the UL-SRSs and the SL-BMRSs, where the Tx-QCL relationship indicates Q transmit beam patterns from the N transmit beam patterns for SL-BM, and Q is an integer greater than or equal to 1 and less than N; and receiving, from the base station, an allocation of the SL resources, where the SL resources are allocated by the base station for the SL-BMRSs; and where transmitting, to the second electronic device, the SL-BMRSs comprises transmitting, to the second electronic device, the SL-BMRSs on the SL resources using beams from the Q transmit beam patterns.

A second feature, combinable with any of the previous or following features, where each transmit beam pattern of the Q transmit beam patterns indicates a direction away from the base station.

A third feature, combinable with any of the previous or following features, where receiving the information associated with SL-BM comprises: receiving, from the base station, an Anti-Tx-QCL relationship between the UL-SRSs and the SL-BMRSs, where the Anti-Tx-QCL relationship indicates P transmit beam patterns from the N transmit beam patterns not for SL-BM, and P is an integer greater than or equal to 1 and less than N; and receiving, from the base station, an allocation of the SL resources, where the SL resources are allocated by the base station for the SL-BMRSs; and where transmitting, to the second electronic device, the SL-BMRSs comprises transmitting, to the second electronic device, the SL-BMRSs on the SL resources using transmit beam patterns that are included in the N transmit beam patterns and not included in the P transmit beam patterns.

A fourth feature, combinable with any of the previous or following features, where the operations further comprise: receiving, from the base station, configuration information indicating the N UL-SRS resources; determining the N transmit beam patterns based on the N UL-SRS resources; and receiving, from the second electronic device, a SL beam report, where the SL beam report is generated by the second electronic device based on measurements of the SL-BMRSs on the SL resources.

A fifth feature, combinable with any of the previous or following features, where the information associated with SL-BM includes a bitmap with N bits, a positive bit in the bitmap indicates that a corresponding transmit beam pattern is allowed for transmitting the SL-BMRSs, and a negative or zero bit in the bitmap indicates that a corresponding transmit beam pattern is prohibited for transmitting the SL-BMRSs.

A sixth feature, combinable with any of the previous or following features, where the base station includes a 5G base station (gNB), the first electronic device is under coverage of the gNB, the second electronic device is outside the coverage of the gNB, and the first and second electronic devices communicate through a sidelink.

In a third implementation, a non-transitory computer-readable medium storing computer instructions for transmission beam control in a data communication, that when executed by one or more hardware processors, cause the one or more hardware processors to perform operations including: transmitting, by a first electronic device and to a base station, uplink sounding reference signals (UL-SRSs) on N UL-SRS resources using N transmit beam patterns, where N is an integer greater than 1; receiving, by the first electronic device and from the base station, information associated with sidelink beam management (SL-BM), where the information associated with SL-BM indicates SL resources allocated to the first electronic device and beam pattern indices indicating transmit beam patterns for SL-BM; and transmitting, by the first electronic device and to a second electronic device, one or more sidelink beam management reference signals (SL-BMRSs), based on the received information associated with SL-BM, using one or more of the indicated transmit beam patterns.

The foregoing and other described implementations can each, optionally, include one or more of the following features:

A first feature, combinable with any of the following features, where receiving the information associated with SL-BM comprises: receiving, by the first electronic device and from the base station, a transmitter quasi co-located (Tx-QCL) relationship between the UL-SRSs and the SL-BMRSs, where the Tx-QCL relationship indicates Q transmit beam patterns from the N transmit beam patterns for SL-BM, and Q is an integer greater than or equal to 1 and less than N; and receiving, by the first electronic device and from the base station, an allocation of the SL resources, where the SL resources are allocated by the base station for the SL-BMRSs; and where transmitting, by the first electronic device and to the second electronic device, the SL-BMRSs comprises transmitting, by the first electronic device and to the second electronic device, the SL-BMRSs on the SL resources using beams from the Q transmit beam patterns.

A second feature, combinable with any of the previous or following features, where each transmit beam pattern of the Q transmit beam patterns indicates a direction away from the base station.

A third feature, combinable with any of the previous or following features, where receiving the information associated with SL-BM comprises: receiving, by the first electronic device and from the base station, an Anti-Tx-QCL relationship between the UL-SRSs and the SL-BMRSs, where the Anti-Tx-QCL relationship indicates P transmit beam patterns from the N transmit beam patterns not for SL-BM, and P is an integer greater than or equal to 1 and less than N; and receiving, by the first electronic device and from the base station, an allocation of the SL resources, where the SL resources are allocated by the base station for the SL-BMRSs; and where transmitting, by the first electronic device and to the second electronic device, the SL-BMRSs comprises transmitting, by the first electronic device and to the second electronic device, the SL-BMRSs on the SL resources using transmit beam patterns that are included in the N transmit beam patterns and not included in the P transmit beam patterns.

A fourth feature, combinable with any of the previous or following features, where the operations further comprise: receiving, by the first electronic device and from the base station, configuration information indicating the N UL-SRS resources; determining, by the first electronic device, the N transmit beam patterns based on the N UL-SRS resources; and receiving, by the first electronic device and from the second electronic device, a SL beam report, where the SL beam report is generated by the second electronic device based on measurements of the SL-BMRSs on the SL resources.

A fifth feature, combinable with any of the previous or following features, where the information associated with SL-BM includes a bitmap with N bits, a positive bit in the bitmap indicates that a corresponding transmit beam pattern is allowed for transmitting the SL-BMRSs, and a negative or zero bit in the bitmap indicates that a corresponding transmit beam pattern is prohibited for transmitting the SL-BMRSs.

A sixth feature, combinable with any of the previous or following features, where the base station includes a 5G base station (gNB), the first electronic device is under coverage of the gNB, the second electronic device is outside the coverage of the gNB, and the first and second electronic devices communicate through a sidelink.

In a fourth implementation, a computer-implemented method includes: receiving, by a base station and from a first electronic device, uplink sounding reference signals (UL-SRSs) on N UL-SRS resources using N transmit beam patterns, where N is an integer greater than 1; and transmitting, by the base station and to the first electronic device, information associated with sidelink beam management (SL-BM), where the information associated with SL-BM indicates SL resources allocated to the first electronic device and beam pattern indices indicating transmit beam patterns for SL-BM.

The foregoing and other described implementations can each, optionally, include one or more of the following features:

A first feature, combinable with any of the following features, where transmitting the information associated with SL-BM comprises: transmitting, by the base station and to the first electronic device, a transmitter quasi co-located (Tx-QCL) relationship between the UL-SRSs and one or more sidelink beam management reference signals (SL-BMRSs), where the Tx-QCL relationship indicates Q transmit beam patterns from the N transmit beam patterns for SL-BM, and Q is an integer greater than or equal to 1 and less than N; and transmitting, by the base station and to the first electronic device, the SL resources, where the SL resources are allocated by the base station for the SL-BMRSs.

A second feature, combinable with any of the previous or following features, where each transmit beam pattern of the Q transmit beam patterns indicates a direction away from the base station.

A third feature, combinable with any of the previous or following features, where transmitting the information associated with SL-BM comprises: transmitting, by the base station and to the first electronic device, an Anti-Tx-QCL relationship between the UL-SRSs and one or more sidelink beam management reference signals (SL-BMRSs), where the Anti-Tx-QCL relationship indicates P transmit beam patterns from the N transmit beam patterns not for SL-BM, and P is an integer greater than or equal to 1 and less than N; and transmitting, by the base station and to the first electronic device, the SL resources, where the SL resources are allocated by the base station for the SL-BMRSs.

A fourth feature, combinable with any of the previous or following features, further comprising transmitting, by the base station and to the first electronic device, configuration information indicating the N UL-SRS resources.

A fifth feature, combinable with any of the previous or following features, where the information associated with SL-BM includes a bitmap with N bits, a positive bit in the bitmap indicates that a corresponding transmit beam pattern is allowed for transmitting the SL-BMRSs, and a negative or zero bit in the bitmap indicates that a corresponding transmit beam pattern is prohibited for transmitting the SL-BMRSs.

A sixth feature, combinable with any of the previous or following features, where the base station includes a 5G base station (gNB), and the first electronic device is under coverage of the gNB.

In a fifth implementation, a base station includes: a non-transitory memory storage comprising instructions; and one or more hardware processors in communication with the memory storage, where the one or more hardware processors execute the instructions to perform operations comprising: receiving, from a first electronic device, uplink sounding reference signals (UL-SRSs) on N UL-SRS resources using N transmit beam patterns, where N is an integer greater than 1; and transmitting, to the first electronic device, information associated with sidelink beam management (SL-BM), where the information associated with SL-BM indicates SL resources allocated to the first electronic device and beam pattern indices indicating transmit beam patterns for SL-BM.

The foregoing and other described implementations can each, optionally, include one or more of the following features:

A first feature, combinable with any of the following features, where transmitting the information associated with SL-BM comprises: transmitting, to the first electronic device, a transmitter quasi co-located (Tx-QCL) relationship between the UL-SRSs and one or more sidelink beam management reference signals (SL-BMRSs), where the Tx-QCL relationship indicates Q transmit beam patterns from the N transmit beam patterns for SL-BM, and Q is an integer greater than or equal to 1 and less than N; and transmitting, to the first electronic device, the SL resources, where the SL resources are allocated by the base station for the SL-BMRSs.

A second feature, combinable with any of the previous or following features, where each transmit beam pattern of the Q transmit beam patterns indicates a direction away from the base station.

A third feature, combinable with any of the previous or following features, where transmitting the information associated with SL-BM comprises: transmitting, to the first electronic device, an Anti-Tx-QCL relationship between the UL-SRSs and one or more sidelink beam management reference signals (SL-BMRSs), where the Anti-Tx-QCL relationship indicates P transmit beam patterns from the N transmit beam patterns not for SL-BM, and P is an integer greater than or equal to 1 and less than N; and transmitting, to the first electronic device, the SL resources, where the SL resources are allocated by the base station for the SL-BMRSs.

A fourth feature, combinable with any of the previous or following features, where the operations further comprise transmitting, to the first electronic device, configuration information indicating the N UL-SRS resources.

A fifth feature, combinable with any of the previous or following features, where the information associated with SL-BM includes a bitmap with N bits, a positive bit in the bitmap indicates that a corresponding transmit beam pattern is allowed for transmitting the SL-BMRSs, and a negative or zero bit in the bitmap indicates that a corresponding transmit beam pattern is prohibited for transmitting the SL-BMRSs.

A sixth feature, combinable with any of the previous or following features, where the base station includes a 5G base station (gNB), and the first electronic device is under coverage of the gNB.

In a sixth implementation, a non-transitory computer-readable medium storing computer instructions for transmission beam control in a data communication, that when executed by one or more hardware processors, cause the one or more hardware processors to perform operations including: receiving, by a base station and from a first electronic device, uplink sounding reference signals (UL-SRSs) on N UL-SRS resources using N transmit beam patterns, where N is an integer greater than 1; and transmitting, by the base station and to the first electronic device, information associated with sidelink beam management (SL-BM), where the information associated with SL-BM indicates SL resources allocated to the first electronic device and beam pattern indices indicating transmit beam patterns for SL-BM.

The foregoing and other described implementations can each, optionally, include one or more of the following features:

A first feature, combinable with any of the following features, where transmitting the information associated with SL-BM comprises: transmitting, by the base station and to the first electronic device, a transmitter quasi co-located (Tx-QCL) relationship between the UL-SRSs and one or more sidelink beam management reference signals (SL-BMRSs), where the Tx-QCL relationship indicates Q transmit beam patterns from the N transmit beam patterns for SL-BM, and Q is an integer greater than or equal to 1 and less than N; and transmitting, by the base station and to the first electronic device, the SL resources, where the SL resources are allocated by the base station for the SL-BMRSs.

A second feature, combinable with any of the previous or following features, where each transmit beam pattern of the Q transmit beam patterns indicates a direction away from the base station.

A third feature, combinable with any of the previous or following features, where transmitting the information associated with SL-BM comprises: transmitting, by the base station and to the first electronic device, an Anti-Tx-QCL relationship between the UL-SRSs and one or more sidelink beam management reference signals (SL-BMRSs), where the Anti-Tx-QCL relationship indicates P transmit beam patterns from the N transmit beam patterns not for SL-BM, and P is an integer greater than or equal to 1 and less than N; and transmitting, by the base station and to the first electronic device, the SL resources, where the SL resources are allocated by the base station for the SL-BMRSs.

A fourth feature, combinable with any of the previous or following features, further comprising transmitting, by the base station and to the first electronic device, configuration information indicating the N UL-SRS resources.

A fifth feature, combinable with any of the previous or following features, where the information associated with SL-BM includes a bitmap with N bits, a positive bit in the bitmap indicates that a corresponding transmit beam pattern is allowed for transmitting the SL-BMRSs, and a negative or zero bit in the bitmap indicates that a corresponding transmit beam pattern is prohibited for transmitting the SL-BMRSs.

A sixth feature, combinable with any of the previous or following features, where the base station includes a 5G base station (gNB), and the first electronic device is under coverage of the gNB.

Implementations of the subject matter and the functional operations described in this specification can be implemented in digital electronic circuitry, intangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially-generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a Central Processing Unit (CPU), a Field Programmable Gate Array (FPGA), or an Application-specific Integrated Circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other units suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a ROM or a Random Access Memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a Personal Digital Assistant (PDA), a mobile audio or video player, a game console, a Global Positioning System (GPS) receiver, or a portable storage device, for example, a Universal Serial Bus (USB) flash drive, to name just a few.

Computer-readable media (transitory or non-transitory, as appropriate) suitable for storing computer program instructions and data includes non-volatile memory, media and memory devices, including by way of example, semiconductor memory devices, for example, Erasable Programmable Read-Only Memory (EPROM), Electrically Erasable Programmable Read-Only Memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a Cathode Ray Tube (CRT), Liquid Crystal Display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other types of touchscreens. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a Command Line Interface (CLI) that processes information and efficiently presents the information results to the user. In general, a GUI may include a plurality of User Interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a Local Area Network (LAN), a Radio Access Network (RAN), a Metropolitan Area Network (MAN), a Wide Area Network (WAN), Worldwide Interoperability for Microwave Access (WIMAX), a Wireless Local Area Network (WLAN) using, for example, 802.11 a/b/g/n or 802.20 (or a combination of 802.1ix and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method, comprising:
   transmitting, by a first electronic device to a base station, uplink sounding reference signals (UL-SRSs) on N UL-SRS resources using N transmit beam patterns, wherein N is an integer greater than 1;
   receiving, by the first electronic device from the base station, information associated with sidelink beam management (SL-BM), wherein the information associated with SL-BM indicates beam pattern indices indicating transmit beam patterns for SL-BM;
   receiving, by the first electronic device from the base station, a relationship between the UL-SRSs and one or more sidelink beam management reference signals (SL-BMRSs),
   wherein the relationship indicates Q transmit beam patterns from the N transmit beam patterns for SL-BM, Q being an integer greater than or equal to 1 and less than N, or
   wherein the relationship indicates P transmit beam patterns from the N transmit beam patterns not for SL-BM, P being an integer greater than or equal to 1 and less than N; and
   transmitting, by the first electronic device to a second electronic device, the one or more SL-BMRSs, based on the information associated with SL-BM, using beams from the Q transmit beam patterns or using transmit beam patterns that are included in the N transmit beam patterns and not included in the P transmit beam patterns.

2. The method according to claim 1, wherein the receiving the relationship comprises:
   receiving, by the first electronic device from the base station, a transmitter quasi co-located (Tx-QCL) relationship between the UL-SRSs and the one or more SL-BMRSs, wherein the Tx-QCL relationship indicates the Q transmit beam patterns from the N transmit beam patterns for SL-BM; and
   receiving, by the first electronic device from the base station, an allocation of SL resources, wherein the SL resources are allocated by the base station for the one or more SL-BMRSs.

3. The method according to claim 2, wherein each transmit beam pattern of the Q transmit beam patterns indicates a direction away from the base station.

4. The method according to claim 1, wherein the receiving the relationship comprises:
   receiving, by the first electronic device from the base station, an Anti-Tx-QCL relationship between the UL-SRSs and the one or more SL-BMRSs, wherein the Anti-Tx-QCL relationship indicates the P transmit beam patterns from the N transmit beam patterns not for SL-BM; and
   receiving, by the first electronic device from the base station, an allocation of SL resources, wherein the SL resources are allocated by the base station for the one or more SL-BMRSs.

5. The method according to claim 1, further comprising:
   receiving, by the first electronic device from the base station, configuration information indicating the N UL-SRS resources;
   determining, by the first electronic device, the N transmit beam patterns based on the N UL-SRS resources; and
   receiving, by the first electronic device from the second electronic device, a SL beam report, wherein the SL beam report is generated by the second electronic device based on measurements of the one or more SL-BMRSs on SL resources.

6. The method according to claim 1, wherein the information associated with SL-BM includes a bitmap with N bits, a positive bit in the bitmap indicates that a corresponding transmit beam pattern is allowed for transmitting the one or more SL-BMRSs, and a negative or zero bit in the bitmap indicates that a corresponding transmit beam pattern is prohibited for transmitting the one or more SL-BMRSs.

7. The method according to claim 1, wherein the base station includes a 5G base station (gNB), the first electronic device is under coverage of the gNB, the second electronic device is outside the coverage of the gNB, and the first and second electronic devices communicate through a sidelink.

8. A first electronic device, comprising:
   a non-transitory memory storage comprising instructions; and
   one or more hardware processors in communication with the non-transitory memory storage, wherein the one or more hardware processors execute the instructions to cause the first electronic device to perform operations comprising:
     transmitting, to a base station, uplink sounding reference signals (UL-SRSs) on N UL-SRS resources using N transmit beam patterns, wherein N is an integer greater than 1;
     receiving, from the base station, information associated with sidelink beam management (SL-BM), wherein the information associated with SL-BM indicates beam pattern indices indicating transmit beam patterns for SL-BM;
     receiving, from the base station, a relationship between the UL-SRSs and one or more sidelink beam management reference signals (SL-BMRSs),
     wherein the relationship indicates Q transmit beam patterns from the N transmit beam patterns for SL-BM, Q being an integer greater than or equal to 1 and less than N, or
     wherein the relationship indicates P transmit beam patterns from the N transmit beam patterns not for SL-BM, P being an integer greater than or equal to 1 and less than N; and transmitting, to a second electronic device, the one or more SL-BMRSs, based on the information associated with SL-BM, using beams from the Q transmit beam patterns or using transmit beam patterns that are included in the N transmit beam patterns and not included in the P transmit beam patterns.

9. The first electronic device according to claim 8, wherein the receiving the relationship comprises:
receiving, from the base station, a transmitter quasi co-located (Tx-QCL) relationship between the UL-SRSs and the one or more SL-BMRSs, wherein the Tx-QCL relationship indicates the Q transmit beam patterns from the N transmit beam patterns for SL-BM; and
receiving, from the base station, an allocation of SL resources, wherein the SL resources are allocated by the base station for the one or more SL-BMRSs.

10. The first electronic device according to claim 9, wherein each transmit beam pattern of the Q transmit beam patterns indicates a direction away from the base station.

11. The first electronic device according to claim 8, wherein the receiving the relationship comprises:
receiving, from the base station, an Anti-Tx-QCL relationship between the UL-SRSs and the one or more SL-BMRSs, wherein the Anti-Tx-QCL relationship indicates the P transmit beam patterns from the N transmit beam patterns not for SL-BM; and
receiving, from the base station, an allocation of SL resources, wherein the SL resources are allocated by the base station for the one or more SL-BMRSs.

12. The first electronic device according to claim 8, wherein the operations further comprise:
receiving, from the base station, configuration information indicating the N UL-SRS resources;
determining the N transmit beam patterns based on the N UL-SRS resources; and
receiving, from the second electronic device, a SL beam report, wherein the SL beam report is generated by the second electronic device based on measurements of the one or more SL-BMRSs on SL resources.

13. The first electronic device according to claim 8, wherein the information associated with SL-BM includes a bitmap with N bits, a positive bit in the bitmap indicates that a corresponding transmit beam pattern is allowed for transmitting the one or more SL-BMRSs, and a negative or zero bit in the bitmap indicates that a corresponding transmit beam pattern is prohibited for transmitting the one or more SL-BMRSs.

14. The first electronic device according to claim 8, wherein the base station includes a 5G base station (gNB), the first electronic device is under coverage of the gNB, the second electronic device is outside the coverage of the gNB, and the first and second electronic devices communicate through a sidelink.

15. A method, comprising:
receiving, by a base station from a first electronic device, uplink sounding reference signals (UL-SRSs) on N UL-SRS resources using N transmit beam patterns, wherein N is an integer greater than 1;
transmitting, by the base station and to the first electronic device, information associated with sidelink beam management (SL-BM), wherein the information associated with SL-BM indicates beam pattern indices indicating transmit beam patterns for SL-BM; and
transmitting, by the base station to the first electronic device, a relationship between the UL-SRSs and one or more sidelink beam management reference signals (SL-BMRSs),
wherein the relationship indicates Q transmit beam patterns from the N transmit beam patterns for SL-BM, Q being an integer greater than or equal to 1 and less than N, or
wherein the relationship indicates P transmit beam patterns from the N transmit beam patterns not for SL-BM, P being an integer greater than or equal to 1 and less than N.

16. The method according to claim 15, wherein the transmitting the relationship comprises:
transmitting, by the base station to the first electronic device, a transmitter quasi co-located (Tx-QCL) relationship between the UL-SRSs and the one or more SL-BMRSs, wherein the Tx-QCL relationship indicates the Q transmit beam patterns from the N transmit beam patterns for SL-BM; and
transmitting, by the base station to the first electronic device, SL resources, wherein the SL resources are allocated by the base station for the one or more SL-BMRSs.

17. The method according to claim 16, wherein each transmit beam pattern of the Q transmit beam patterns indicates a direction away from the base station.

18. The method according to claim 16, wherein the information associated with SL-BM includes a bitmap with N bits, a positive bit in the bitmap indicates that a corresponding transmit beam pattern is allowed for transmitting the one or more SL-BMRSs, and a negative or zero bit in the bitmap indicates that a corresponding transmit beam pattern is prohibited for transmitting the one or more SL-BMRSs.

19. The method according to claim 15, wherein the transmitting the relationship comprises:
transmitting, by the base station to the first electronic device, an Anti-Tx-QCL relationship between the UL-SRSs and the one or more SL-BMRSs, wherein the Anti-Tx-QCL relationship indicates the P transmit beam patterns from the N transmit beam patterns not for SL-BM; and
transmitting, by the base station to the first electronic device, SL resources, wherein the SL resources are allocated by the base station for the one or more SL-BMRSs.

20. The method according to claim 15, further comprising:
transmitting, by the base station and to the first electronic device, configuration information indicating the N UL-SRS resources.

21. The method according to claim 15, wherein the base station includes a 5G base station (gNB), and the first electronic device is under coverage of the gNB.

22. A base station, comprising:
a non-transitory memory storage comprising instructions; and
one or more hardware processors in communication with the non-transitory memory storage, wherein the one or more hardware processors execute the instructions to perform operations comprising:
receiving, from a first electronic device, uplink sounding reference signals (UL-SRSs) on N UL-SRS resources using N transmit beam patterns, wherein N is an integer greater than 1;
transmitting, to the first electronic device, information associated with sidelink beam management (SL-BM), wherein the information associated with SL-BM indicates beam pattern indices indicating transmit beam patterns for SL-BM; and transmitting, to the first electronic device, a relationship between the UL-SRSs and one or more sidelink beam management reference signals (SL-BMRSs),
wherein the relationship indicates Q transmit beam patterns from the N transmit beam patterns for SL-BM, Q being an integer greater than or equal to 1 and less than N, or
wherein the relationship indicates P transmit beam patterns from the N transmit beam patterns not for SL-BM, P being an integer greater than or equal to 1 and less than N.

23. The base station according to claim 22, wherein the transmitting the relationship comprises:
transmitting, to the first electronic device, a transmitter quasi co-located (Tx-QCL) relationship between the UL-SRSs and the one or more SL-BMRSs, wherein the Tx-QCL relationship indicates the Q transmit beam patterns from the N transmit beam patterns for SL-BM; and
transmitting, to the first electronic device, SL resources, wherein the SL resources are allocated by the base station for the one or more SL-BMRSs.

24. The base station according to claim 23, wherein each transmit beam pattern of the Q transmit beam patterns indicates a direction away from the base station.

25. The base station according to claim 23, wherein the information associated with SL-BM includes a bitmap with N bits, a positive bit in the bitmap indicates that a corresponding transmit beam pattern is allowed for transmitting the one or more SL-BMRSs, and a negative or zero bit in the bitmap indicates that a corresponding transmit beam pattern is prohibited for transmitting the one or more SL-BMRSs.

26. The base station according to claim 22, wherein the transmitting the relationship comprises:
transmitting, to the first electronic device, an Anti-Tx-QCL relationship between the UL-SRSs and the one or more SL-BMRSs, wherein the Anti-Tx-QCL relationship indicates the P transmit beam patterns from the N transmit beam patterns not for SL-BM; and
transmitting, to the first electronic device, SL resources, wherein the SL resources are allocated by the base station for the one or more SL-BMRSs.

27. The base station according to claim 22, wherein the operations further comprise:
transmitting, to the first electronic device, configuration information indicating the N UL-SRS resources.

28. The base station according to claim 22, wherein the base station includes a 5G base station (gNB), and the first electronic device is under coverage of the gNB.

* * * * *